(12) United States Patent
Itabashi

(10) Patent No.: US 6,381,057 B1
(45) Date of Patent: Apr. 30, 2002

(54) MULTI-BEAM SCANNING APPARATUS

(75) Inventor: Akihisa Itabashi, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 09/550,412

(22) Filed: Apr. 17, 2000

(30) Foreign Application Priority Data

Aug. 30, 1999 (JP) .............................. 11-243215

(51) Int. Cl.$^7$ .............................................. G02B 26/08
(52) U.S. Cl. ...................... 359/204; 359/212; 359/216; 347/243
(58) Field of Search .................... 359/204, 212–216; 347/233, 243; 372/24

(56) References Cited

U.S. PATENT DOCUMENTS

| | | | | |
|---|---|---|---|---|
| 4,796,265 A | * | 1/1989 | Asada et al. .................. | 372/31 |
| 5,543,611 A | * | 8/1996 | Andrews ..................... | 250/205 |
| 5,600,126 A | * | 2/1997 | Appel et al. ................. | 250/205 |
| 5,963,242 A | * | 10/1999 | Nakayama et al. ......... | 347/238 |

FOREIGN PATENT DOCUMENTS

JP          5-27189          2/1993

* cited by examiner

*Primary Examiner*—James Phan
(74) *Attorney, Agent, or Firm*—Greenberg Traurig LLP (57) ABSTRACT

A multi-beam scanning apparatus includes a light source having a semiconductor laser chip in which a plurality of light emitting points are arranged such that optical beam spots are impinged at predetermined intervals in a sub-scanning direction on a surface to be scanned. A light receiving element receives a light flux from the semiconductor laser chip for monitoring the light. A case houses therein the semiconductor laser chip and the light receiving element, and has an opening for transmitting the light emitted from a surface of the semiconductor laser chip. A coupling lens couples a divergent light flux from the light source with a subsequent system. A deflector deflects the light flux. A first imaging system arranged between the coupling lens and the deflector has a power in the sub-scanning direction so as to transform the light flux from the coupling lens into a substantially linear image in a vicinity of a deflecting surface of the deflector. A second imaging system images the deflected light flux into an optical beam spot on the surface to be scanned. An intercepting member is arranged between the light source and the surface to be scanned to intercept light, which is emitted from a rear portion of the semiconductor laser chip and dispersed in the case and passes through the case opening, before reaching the surface to be scanned.

19 Claims, 4 Drawing Sheets

MULTI-BEAM SCANNING APPARATUS

FIELD OF THE INVENTION

The present invention relates to a multi-beam scanning apparatus for use in image forming apparatuses such as laser printers and laser copying machines.

DISCUSSION OF THE BACKGROUND

Generally, a beam scanning apparatus scans a surface to be scanned of a photoconductor or other photoconductive member by deflecting a diverging light, which is emitted by a light source unit and which passes through a collimating lens, a cylindrical lens and other lens elements, with a deflector, such as a rotating polygonal mirror, and by imaging the deflected light via an imaging lens. The light source unit includes a semiconductor laser chip to emit light from both sides (front and back) of the laser chip, a photodiode to monitor the light emitted from the back of the semiconductor laser chip, and a case housing the semiconductor laser chip and the photodiode. The case has an opening for allowing the light emitted from the front side of the laser chip to emerge from the case. The light emitted by the semiconductor laser chip is modulated by a modulator according to an image signal, and an image is written on the surface to be scanned of the photoconductor with the modulated light to form a latent image.

Japanese patent laid-open publication No. 5-27189 describes a beam scanning apparatus, in which light, which is emitted from the back of a semiconductor laser chip, dispersed by an internal surface of a laser substrate defining a case of the laser chip, and emerged from an opening of the case as a dispersing light, is intercepted by an intercepting member arranged between a collimating lens and a light source unit so as not to reach the collimating lens. JP No. 527189 further describes another beam scanning apparatus in which the intercepting member functions also as a diaphragm.

In the beam scanning apparatus of JP No. 5-27189, however, because the intercepting member is arranged in the vicinity of a light emitting point of the light source unit, the intercepting member may intercept the light which is emerged from the front surface of the semiconductor laser chip and is desired to reach the collimating lens for scanning. In order to arrange the intercepting member so as not to intercept such light required for scanning, on the other hand, the light emitted from the back of the semiconductor laser chip, dispersed by the internal surface of the laser case and emerged from the opening of the laser case may not be sufficiently and effectively intercepted by the intercepting member.

Further, when using the intercepting member as the diaphragm in the apparatus of JP 5-27189, the intercepting member must be arranged in the vicinity of the light emitting point and must be located at a position along the light path where the light flux is diverging. Thus, a relatively high positional accuracy is required for the intercepting member.

Furthermore, the scanning apparatus of JP No. 5-27189 requires a relatively large allowance for adjusting the light quantity because the variation of the light quantity is relatively large between the light source units.

When the light source unit includes a plurality of light emitting points, the photodiode for monitoring the light becomes larger than when the light source unit has a single light emitting point by a factor that substantially corresponds to the number of light emitting points. Therefore, the light source unit having a plurality of light emitting points tends to more easily generate dispersed light other than the scanning light. For example, when the photodiode for the light source unit having a single emitting point is 20 square $\mu$m, the photodiode for the light source unit having four light emitting points becomes about 80 square $\mu$m, i.e., four times larger. Further, the opening for emerging light also needs to be enlarged, which increases the possibility that dispersed light other than the light needed for scanning (sometimes referred to as ghost light) emerges from the case.

SUMMARY OF THE INVENTION

In order to overcome the problems described above and other problems, preferred embodiments of the present invention provide a novel multi-beam scanning apparatus that prevents dispersed light, which is generated by the reflection of a light flux from a semiconductor laser chip via a surface of a light receiving element provided for monitoring the light flux, from reaching a surface to be scanned and from forming an abnormal image on the surface to be scanned.

Preferred embodiments of the present invention further provide a novel multi-beam scanning apparatus that eliminates only unnecessary dispersed light without intercepting light that is necessary to form an image on a surface to be scanned.

Further, preferred embodiments of the present invention provide a novel multi-beam scanning apparatus that prevents the reflection of light by an intercepting member, which is intercepting unnecessary dispersed light, to prevent the intercepting member from generating additional dispersed (ghost) light.

Furthermore, preferred embodiments of the present invention provide a novel multi-beam scanning apparatus that prevents dispersed light, generated by the reflection of light from a surface of an intercepting member provided for intercepting unnecessary dispersed light, from reaching a surface to be scanned and thereby causing formation of an abnormal image on the surface to be scanned.

Still furthermore, preferred embodiments of the present invention provide a novel multi-beam scanning apparatus that effectively and efficiently eliminates dispersed light generated by the reflection of light via a surface of a light receiving element which monitors light in a light source unit.

Another preferred embodiment of the present invention provides a novel multi-beam scanning apparatus that suppresses the reflection of light by a surface of a cover of a deflector to prevent additional ghost light from being generated by the cover.

Another preferred embodiment of the present invention further provides a novel multi-beam scanning apparatus that prevents dispersed light, generated by the reflection of light via a surface of a cover of a deflector, from reaching a surface to be scanned and causing formation of an abnormal image on the surface to be scanned.

According to another preferred embodiment of the present invention, a multi-beam scanning apparatus includes a light source having a semiconductor laser chip in which a plurality of light emitting points are arranged such that optical beam spots are arranged at a predetermined interval in a sub-scanning direction on a surface to be scanned. A light receiving element receives a light flux from the semiconductor laser chip for monitoring the light. A case houses therein the semiconductor laser chip and the monitoring light receiving element, and has an opening for emerging the light emitted from a surface of the semiconductor laser chip. A coupling lens couples a divergent light flux from the light source with a subsequent system. A deflector deflects the light flux. A first imaging system arranged between the coupling lens and the deflector has a power in the sub-scanning direction so as to transform the light flux from the coupling lens into a substantially linear image in a vicinity of a deflecting surface of the deflector. A second imaging system images the deflected light flux into an optical beam spot on the surface to be scanned. An intercepting member is arranged between the light source and the surface to be scanned to intercept light, which is emitted from the back of the semiconductor laser chip and dispersed in the case and passes the opening, before reaching the surface to be scanned.

According to a preferred embodiment of the present invention, the intercepting member may be arranged so as not to intercept scanning light which is provided and used for forming an image on the surface to be scanned. Further, the intercepting member may have either a reflection preventing coating or a reflection preventing treatment, or may be made of a material having a low reflectance.

Furthermore, the intercepting member may be angled such that the dispersed light does not reach the surface to be scanned in a main scanning direction. Also, the intercepting member may have either an angle of elevation or an angle of depression relative to a scanning plane so that the dispersed light does not reach the surface to be scanned. The intercepting member may also preferably be arranged between the coupling lens and the deflector.

According to another preferred embodiment of the present invention, a multi-beam scanning apparatus transforms a divergent light flux from a light source having a plurality of light emitting points into a linear image in a vicinity of a deflecting surface of a deflector, and images the light flux deflected by the deflector on a surface to be scanned as an optical beam spot. The light source includes a semiconductor laser in which a semiconductor laser chip is accommodated in a laser chip case having an opening for emerging light. A light emitted from a back of the semiconductor laser chip is dispersed in the laser chip case, and an emerging direction of the dispersed light is set such that the dispersed light passed though the opening reaches portions and locations on the surface to be scanned other than an image writing area.

According to preferred embodiments of the present invention, the emerging direction of the dispersed light may be directed toward a cover of the deflector. Further, the cover may be provided with reflection preventing coating or reflection preventing treatment, or a low reflectance member may be provided as part of the cover including parts where the dispersed light is impinged upon.

Further, the cover may be configured such that a direction of the dispersed light reflected by the cover leads to an outside of the image forming area in a man scanning direction.

Furthermore, a reflecting surface of the cover may be angled such that the dispersed light reflected by the cover leads to an outside of the image forming area in a sub-scanning direction.

BRIEF DESCRIPTION OF THE DRAWINGS

A more complete appreciation of the present invention and many of the attendant advantages thereof will be readily obtained as the same becomes better understood by reference to the following detailed description of preferred embodiments when considered in conjunction with accompanying drawings, wherein.

DETAILED DESCRIPTION OF PREFERRED EMBODIMENTS

Referring now to the drawings, wherein like reference numerals designate identical or corresponding, preferred embodiments of the present invention are described.

Figure 1:
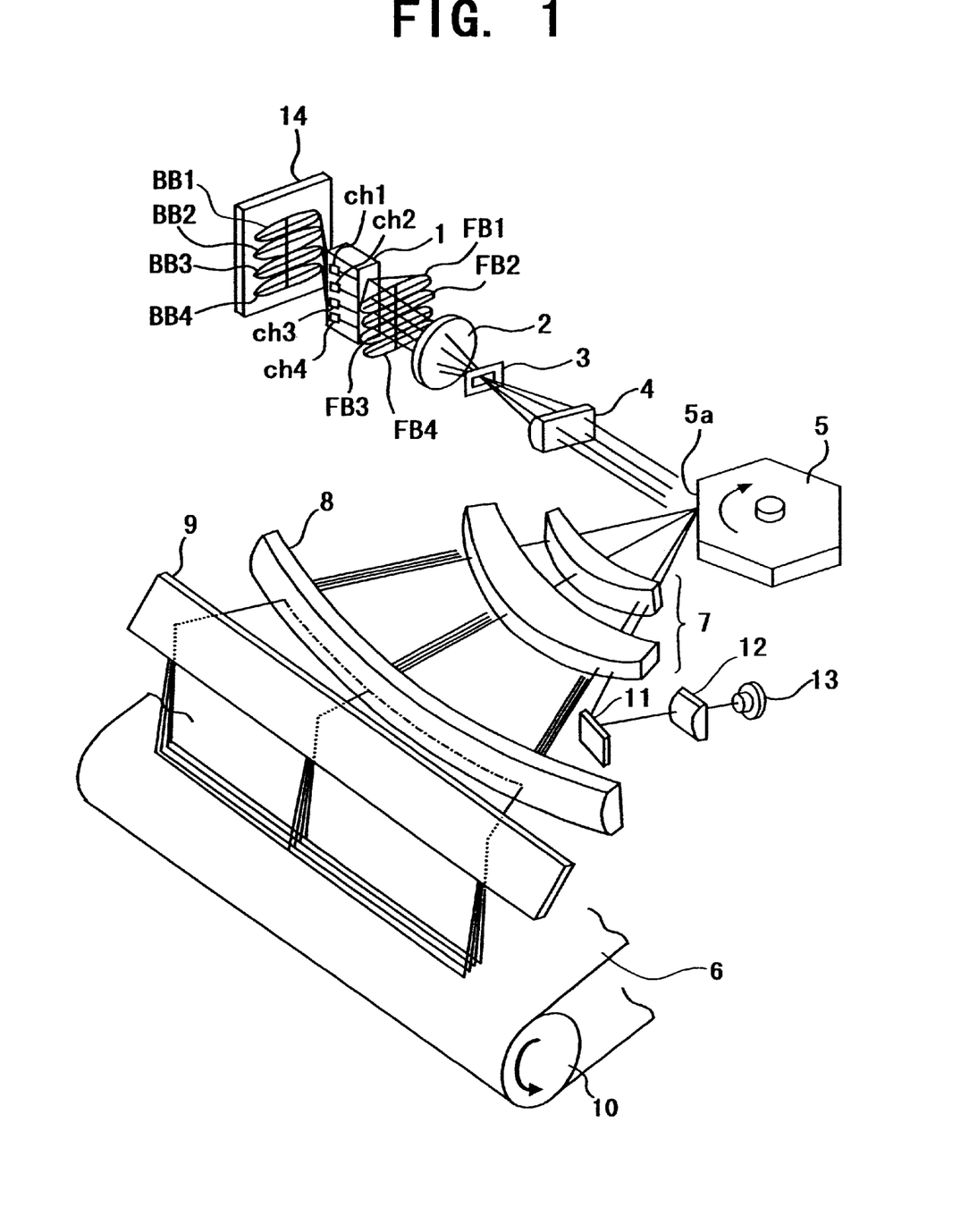
FIG. 1 is a schematic drawing illustrating a construction of a multi-beam scanning apparatus according to a preferred embodiment of the present invention.

FIG. 1 is a schematic drawing illustrating a construction of a multi-beam scanning apparatus according to a preferred embodiment of the present invention. A light source 1 having a plurality of light emitting points emits a plurality of diverging light fluxes FB1–FB4 from the front surface of the light source 1. The plurality of light fluxes FB1–FB4 pass through a condensing lens 2 and are condensed thereby, and then the diameter of the light fluxes are regulated by a diaphragm 3. The light fluxes FB1–FB4 are then formed into linear images in the vicinity of a deflecting surface 5a of a deflector 5 by a linear image forming optical system 4. As the deflector 5, for example, a rotating polygonal mirror or other suitable deflector is preferably used, and the polygonal mirror 5 is rotated by a driving device (not shown) so as to deflect a light flux from the linear image forming optical system 5 at an equiangular velocity.

An imaging system including a fθ lens 7 and a cylindrical lens 8 is arranged between the deflector 5 and a scanned medium 6, and the light flux deflected by the deflector 5 is formed as an optical beam spot on a surface to be scanned of the scanned medium 6 via a mirror 9 by the fθ lens 7 and cylindrical lens 8. The optical beam spot scans the surface to be scanned of the scanned medium 6 in the main scanning direction with rotation of the deflector 5.

As the scanned medium 6, for example, a drum-shaped photoconductor wound around a plurality of rollers 10 is preferably used, and the drum-shaped photoconductor 6 is rotated by the driving device so as to move in the sub-scanning direction at a writing position where the plurality of scanning light fluxes from the mirror 9 irradiate the photoconductor 6. The photoconductor 6 is uniformly charged by a charger (not shown), and when the charged portion of the photoconductor 6 passes the writing position, the charged portion is exposed with the plurality of scanning light fluxes modulated according to an image signal and emitted by the light source 1, and thereby an image (an electrostatic latent image) is formed on the photoconductor 6.

A mirror 11, an imaging element 12 and a synchronization detecting sensor 13 constitute a synchronization detecting system. A scanning light from the fθ lens 7 outside of a writing area is reflected by the mirror 11 and is imaged on the synchronization detecting sensor 13 via the imaging element 12. The synchronization detecting sensor 13 detects an incident light from the imaging element 12 and generates a synchronization detecting signal. The light emitted by the light source 1 is modulated by a modulator according to an image signal in synchronism with the synchronization detecting signal.

The light source 1 having a plurality of light emitting points in this preferred embodiment preferably includes a semiconductor laser chip having four light emitting points constructed with four channels ch1–ch4. The semiconductor laser chip 1 is preferably configured to emit four diverging light fluxes FB1–FB4 and BB1–BB4 respectively from the front and back of the chip 1. The light fluxes FB1–FB4 emitted from the front surface of the chip 1 are transmitted toward the condensing lens 2 and the light fluxes BB1–BB4 emitted from the back surface of the chip I are monitored by a photodiode which defines a light receiving element 14 for monitoring the quantity of output light. A light quantity controller (not shown) controls the semiconductor laser chip 1 to emit a prescribed light quantity according to the output value of the photodiode 14.

Figure 2:
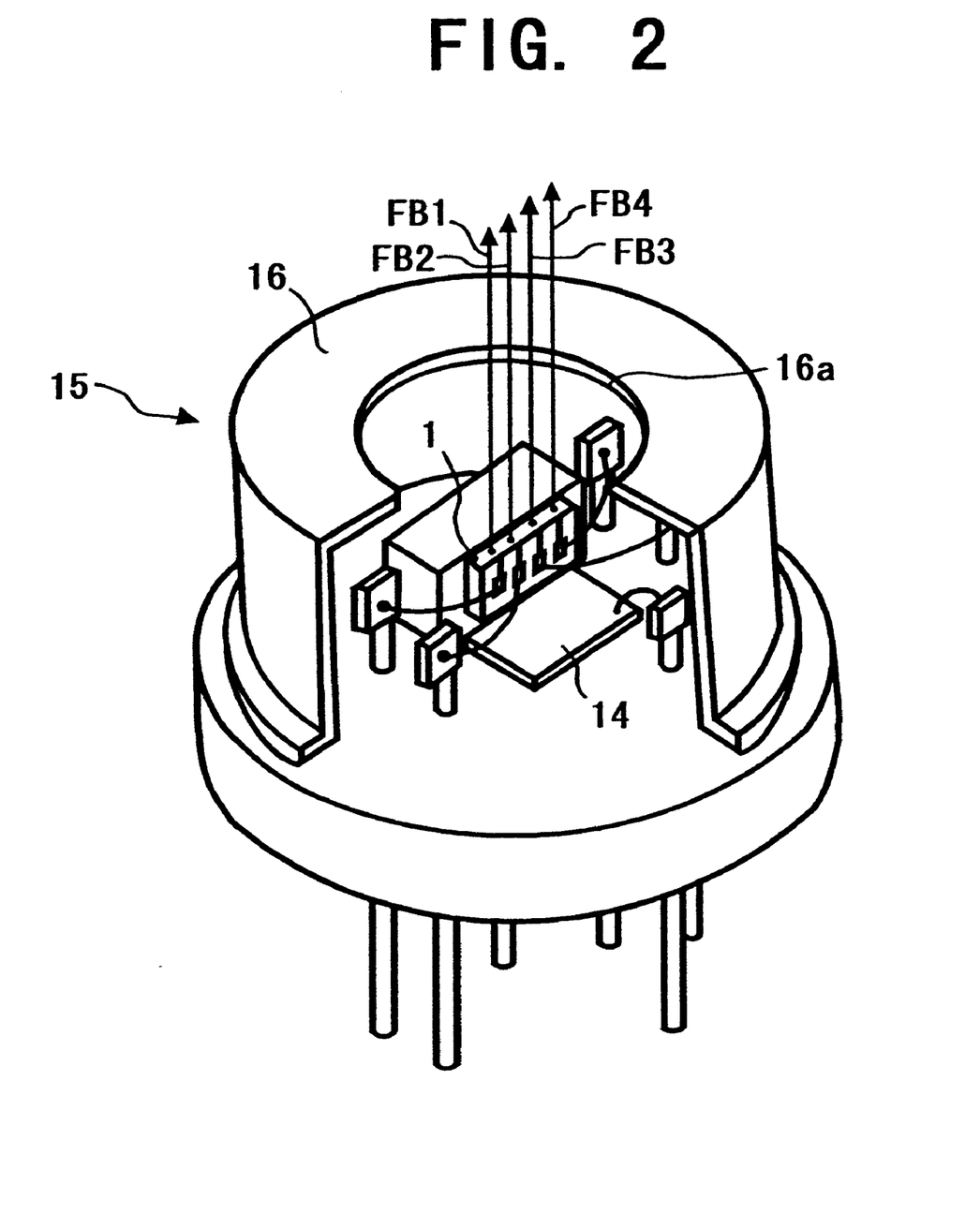
FIG. 2 is a schematic drawing illustrating a construction of a light source unit of the multi-beam scanning apparatus according to a preferred embodiment of the present invention.

FIG. 2 is a schematic drawing illustrating a construction of a light source unit 15 according to a preferred embodiment of the present invention. The light source unit 15 houses the semiconductor laser chip 1 and the photodiode 14 in a package 16 which functions as a case for the light source unit 15. The light fluxes FB1–FB4 emitted from the front surface of the semiconductor laser chip 1 emerge toward the condensing lens 2 through a laser window 16a which defines an opening of the package 16. The channels ch1–ch4 of the semiconductor laser chip 1 are respectively modulated by a modulator (not shown) according to an image signal in synchronism with the synchronization detecting signal from the synchronization detecting sensor 13 to emit the light fluxes FB1–FB4, BB1–BB4.

The multi-beam scanning apparatus of this preferred embodiment is preferably provided in an optical housing of a writing unit of an image forming apparatus. The light fluxes BB1–BB4 emitted from the back of the semiconductor laser chip 1 impinge upon and are reflected by the surface of the photodiode 14 to become dispersed light, respectively, which then passes the laser window 16a as so-called ghost light. If the ghost light is reflected in the optical housing of the writing unit and reaches the surface to be scanned, an abnormal image is formed on the surface to be scanned.

Figure 3:
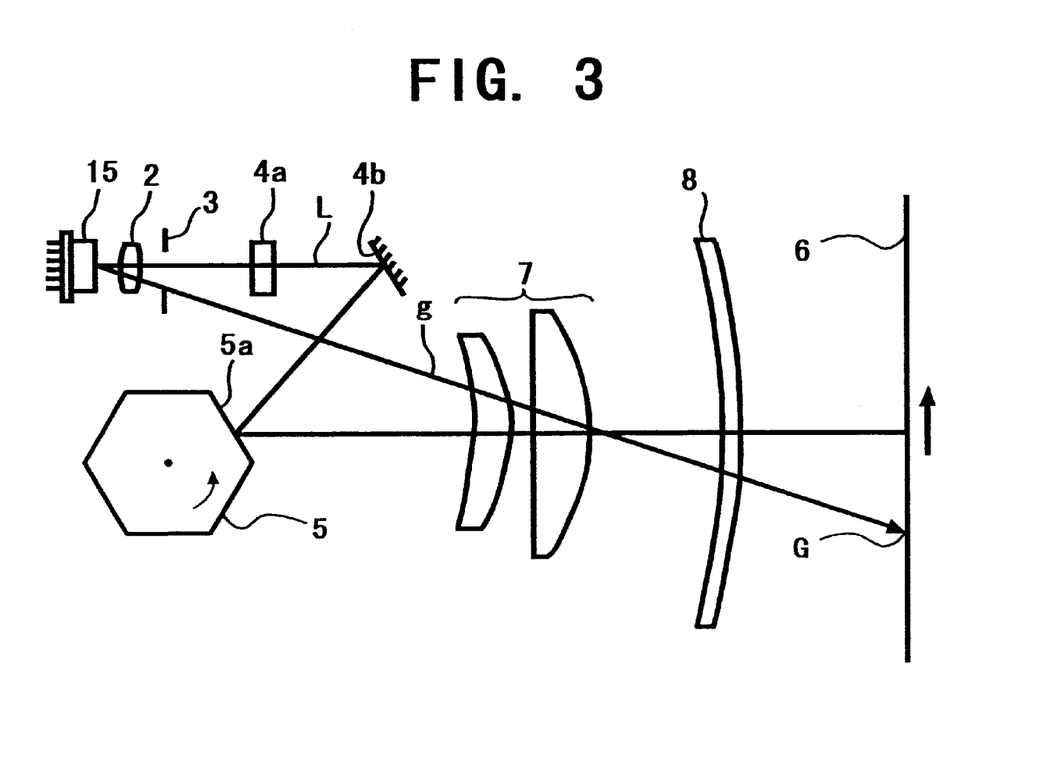
FIG. 3 is a schematic drawing illustrating the optical arrangement of the multi-beam scanning apparatus in the main scanning direction according to a preferred embodiment of the present invention.

FIG. 3 is a schematic drawing illustrating the optical arrangement of the multi-beam scanning apparatus of this preferred embodiment in the main scanning direction. The linear image forming system 4 preferably includes an imaging optical system 4a and a mirror 4b (omitted in FIG. 1) and has a refractive power in the sub-scanning direction, so as to be compact. The mirror 4b reflects a light flux from the imaging optical system 4a toward the deflector 5 and the imaging optical system 4a images the light flux from the diaphragm 3 in a linear form in the vicinity of a deflecting surface 5a of the deflector 5.

The line L in FIG. 3 illustrates the optical path where the light fluxes FB1–FB4 emitted from the front surface of the light source 1 pass to scan the surface to be scanned of the photoconductor 6. The line g illustrates the path through which the light fluxes BB1–BB4, which are emitted from the back of the semiconductor laser chip 1, reflected by the surface of the photodiode 14 to become dispersed light and emerge through the laser window 16a of the package 16, reach the surface to be scanned of the photoconductor 6 as ghost light.

The photodiode 14 is inclined such that a light flux reflected by the photodiode 14 does not pass near the optical path for scanning to form an image on the surface to be scanned. In this preferred embodiment, the ghost light traverses the scanning optical system towards the surface to be scanned of the photoconductor 6. Because the ghost light is not deflected by the deflector 5, if the ghost light continues to reach and expose the same position G on the surface to be scanned, even when the light quantity of the ghost light is very small, the energy of the ghost light accumulates on the photoconductor 6 to become sufficiently large to cause formation of an abnormal image.

Figure 4:
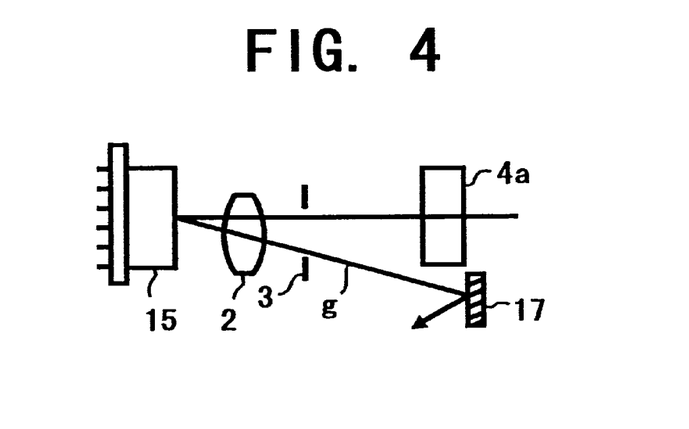
FIG. 4 is a schematic drawing illustrating an exemplary arrangement of an intercepting member for intercepting unnecessary dispersed light in the multi-beam scanning apparatus according to a preferred embodiment of the present invention.

The emerging direction of the ghost light is determined by the slanting or inclination angle of the photodiode 14. Accordingly, the optical path of the ghost light can be easily predicted and a position of an intercepting member for intercepting the ghost light while not interfering with the light fluxes used for scanning the surface to be scanned can be determined. For example, as illustrated in FIG. 4, an intercepting plate 17 defining an intercepting member for intercepting the ghost light while not interfering with the light fluxes used for scanning the surface to be scanned is arranged beside the linear image forming optical system 4 between the light source unit 15 and the surface to be scanned so as to intercept only the ghost light without interfering with the light fluxes used for scanning the surface to be scanned.

As described above, because the intercepting plate 17 is arranged between the light source unit 15 and the surface to be scanned, dispersed light generated by the reflection of light from the semiconductor laser chip 1 with the surface of the light receiving element 14 is prevented from reaching the surface to be scanned and prevented from forming an abnormal image thereupon. Further, because the intercepting plate 17 is arranged so as not to intercept the scanning light used for forming an image on the surface to be scanned, only unnecessary light is intercepted by the intercepting plate 17 without intercepting the scanning light used for forming the image on the surface to be scanned.

The intercepting plate 17 may be provided with reflection preventing coating, or reflection preventing treatment, for example, treatment to coarsen the surface of the intercepting plate 17, for preventing formation of secondary dispersed or ghost light by the intercepting plate 17. Alternatively, the intercepting plate 17 may be made of material having a relatively low reflectance. The reflection of light by the intercepting plate 17 is thus prevented and thereby the generation of additional ghost light via the intercepting plate 17 is prevented.

Furthermore, the intercepting plate 17 may be inclined such that a light flux reflected by the intercepting plate 17 does not reach the surface to be scanned of the photoconductor 6 in the main scanning direction. Also, the intercepting plate 17 may be inclined to have either an angle of elevation or an angle of depression relative to a scanning plane in the subscanning direction, so that, even when the ghost light is reflected by the intercepting plate 17, the reflected ghost light does not reach the surface to be scanned of the photoconductor 6. Accordingly, the dispersed light generated by the reflection of light from the surface of the intercepting plate 17 is prevented from reaching the surface to be scanned and prevents formation of an abnormal image on the surface to be scanned.

Furthermore, as described above, the intercepting plate 17 is preferably arranged between the condensing lens 2 and the deflector 5. Therefore, the intercepting plate 17 can be made compact without interfering with the scanning light fluxes while sufficiently and effectively intercepting the ghost light. Further, the dispersed light generated by the reflection of light with the surface of the light receiving element 14 monitoring the light in the light source unit 15 is effectively and efficiently prevented.

As described above, the emerging direction of the ghost light is determined by the inclination angle for the photodiode 14. As a result, the optical path of the ghost light can be easily predicted. Therefore, the optical arrangement can be made such that the ghost light does not reach the image writing area of the surface to be scanned of the photoconductor 6, without providing an intercepting member for intercepting the ghost light, such as the intercepting plate 17.

Further, because the optical path of the ghost light can be predicted, instead of providing an intercepting member for intercepting the ghost light such as the intercepting plate 17, the deflector 5 can be arranged such that a cover of the deflector 5 intercepts the ghost light.

Figure 5:
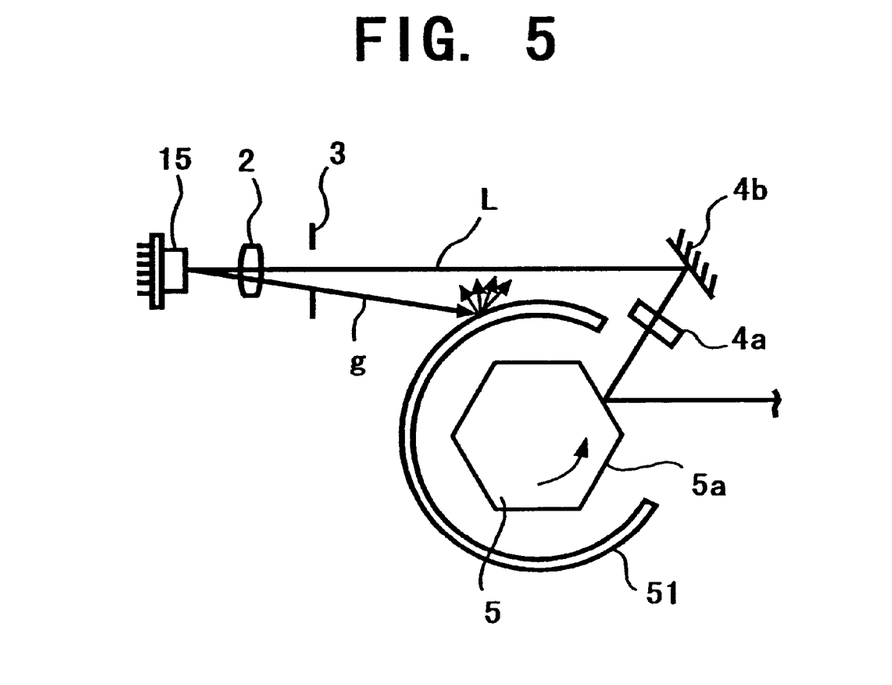
FIG. 5 is a schematic drawing illustrating an exemplary arrangement of a deflector in the multi-beam scanning apparatus according to a preferred embodiment of the present invention.

FIG. 5 illustrates an exemplary arrangement of the deflector 5 in a multi-beam scanning apparatus according to another preferred embodiment of the present invention. When the apparatus has the optical arrangement as illustrated in FIG. 3, by arranging the deflector 5 as illustrated in FIG. 5, only the ghost light 9 is intercepted by a cover 51 of the deflector 5 without intercepting the scanning light flux L.

Further, the cover 51 may be provided with reflection preventing coating, or reflection preventing treatment such as coarsening the surface of the cover 51, so that secondary dispersed or reflected (ghost) light reflected by the surface of the cover 51 is prevented and thereby additional ghost light caused by the dispersed light from the deflector cover 51 is prevented.

Furthermore, a member having a low reflectance, for example, a plate having reflection preventing coating, or reflection preventing treatment such as surface coarsening, flock paper, or other suitable elements, may be pasted on the cover 51.

Figure 6:
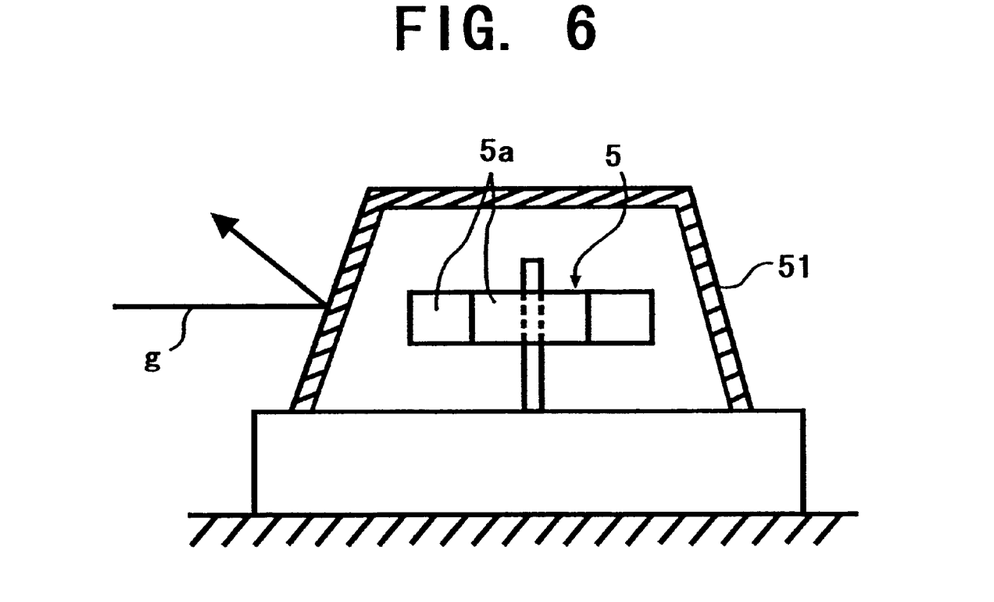
FIG. 6 is a schematic drawing illustrating an exemplary construction of the deflector according to a preferred embodiment of the present invention.

Still furthermore, the cover 51 may be angled, for example as illustrated in FIG. 6, so that the light flux reflected by the cover 51 does not reach the surface to be scanned. As illustrated in FIG. 6, the cover 51 is angled relative to the sub-scanning direction to have either an angle of elevation or an angle of depression. With this configuration, even when the ghost light is reflected by the cover 51, the reflected light is directed outside of the sub-scanning direction of the image writing area.

Also, with respect to the main scanning direction, the plane of the cover 51 where the dispersed light impinges thereupon and the vicinity of the plane may be configured such that the reflected light is directed in a direction that does not lead to the surface to be scanned, that is, in a direction leading to the outside of the image writing area of the scanned medium 6. Thereby, the dispersed ghost light is more effectively and efficiently prevented without intercepting the scanning light fluxes.

Further, the above described reflection preventing treatment or reflection preventing member may be arranged in a position where the dispersed light directed to the outside of the image writing area in the main scanning direction reaches to more completely intercept the dispersed light.

Numerous additional modifications and variations of the present invention are possible in light of the above teachings. It is therefore to be understood that within the scope of the appended claims, the present invention may be practiced otherwise than as specifically described herein.

The present application claims priority and contains subject matter related to Japanese Patent Applications No. 11-243215 filed in the Japanese Patent Office on Aug. 30, 1999, and the entire contents of which are hereby incorporated by reference.

What is claimed as new and is desired to be secured by Letter Patent of the United States is:

1. A multi-beam scanning apparatus, comprising:
a light source having a semiconductor laser chip including a plurality of light emitting points arranged such that optical beam spots are impinged at a predetermined interval in a sub-scanning direction on a surface to be scanned, a light receiving element receiving a light flux from the semiconductor laser chip and arranged to monitor the light, and a case housing the semiconductor laser chip and the monitoring light receiving element and having an opening for allowing the light emitted from a surface of the semiconductor laser chip to emerge from the case;
a coupling lens coupling a divergent light flux from the light source with a subsequent system;
a deflector having a deflecting surface arranged to deflect the light flux;
a first imaging system arranged between the coupling lens and the deflector and having a power in the subscanning direction so as to transform the light flux from the coupling lens into a substantially linear image in a vicinity of the deflecting surface of the deflector;
a second imaging system arranged to image the deflected light flux into an optical beam spot on the surface to be scanned; and
an intercepting member arranged to intercept light which is emitted from a back of the semiconductor laser chip and dispersed in the case and passes through the opening in the case before reaching the surface to be scanned.

2. A multi-beam scanning apparatus according to claim 1, wherein the intercepting member is arranged so as not to intercept scanning light used for forming an image on the surface to be scanned.

3. A multi-beam scanning apparatus according to claim 1, wherein the intercepting member has at least one of a reflection preventing coating and a reflection preventing treatment.

4. A multi-beam scanning apparatus according to claim 1, wherein the intercepting member is made of a material having a low reflectance.

5. A multi-beam scanning apparatus according to claim 1, wherein the intercepting member is angled such that the dispersed light does not reach the surface to be scanned in a main scanning direction.

6. A multi-beam scanning apparatus according to claim 1, wherein the intercepting member has one of an angle of elevation and an angle of depression relative to a scanning plane so that the dispersed light does not reach the surface to be scanned.

7. A multi-beam scanning apparatus according to claim 1, wherein the intercepting member is arranged between the light source and the surface to be scanned.

8. A multi-beam scanning apparatus according to claim 1, wherein the intercepting member is arranged between the coupling lens and the deflector.

9. A multi-beam scanning apparatus according to claim 1, wherein the intercepting member comprises a cover which is arranged to at least partially surround the deflector.

10. A multi-beam scanning apparatus according to claim 9, wherein the cover for the deflector is arranged so as not to intercept scanning light used for forming an image on the surface to be scanned.

11. A multi-beam scanning apparatus comprising:

a light source including a case and a semiconductor laser chip having a plurality of light emitting points, the case having an opening for allowing light generated by the semiconductor laser chip and emitted by the plurality of light emitting points to emerge therefrom as a light flux;

a deflector having a deflecting surface arranged to deflect the light flux; and at least one imaging system arranged to transform the deflected light flux from the deflector an optical beam spot on the surface to be scanned at an image writing area; wherein wherein a light emitted from a back of the semiconductor laser chip is dispersed in the case, and an emerging direction of the dispersed light is set such that the dispersed light passed though the opening reaches portions of the surface to be scanned other than the image writing area.

12. A multi-beam scanning apparatus according to claim 11, the deflector further comprising a cover, wherein the emerging direction of the dispersed light is directed toward the cover of the deflector.

13. A multi-beam scanning apparatus according to claim 11, wherein the cover is provided with at least one of reflection preventing coating and reflection preventing treatment.

14. A multi-beam scanning apparatus according to claim 11, wherein a low reflectance member is part of the cover located at a portion where the dispersed light is impinged.

15. A multi-beam scanning apparatus according to claim 11, wherein the cover is configured such that the dispersed light reflected by the cover leads to an outside of the image forming area in a main scanning direction.

16. A multi-beam scanning apparatus according to claim 11, wherein a reflecting surface of the cover is angled such that the reflected direction of the dispersed light which is reflected off of the cover leads to an outside of the image forming area in a sub-scanning direction.

17. A multi-beam scanning apparatus according to claim 11, wherein the cover is arranged so as not to intercept scanning light used for forming an image on the surface to be scanned.

18. An image forming apparatus, comprising:

a light source having a semiconductor laser chip including a plurality of light emitting points arranged such that optical beam spots are impinged at a predetermined interval in a sub-scanning direction on a surface to be scanned, a light receiving element receiving a light flux from the semiconductor laser chip and arranged to monitor the light, and a case housing the semiconductor laser chip and the monitoring light receiving element and having an opening for allowing the light emitted from a surface of the semiconductor laser chip to emerge from the case;

a coupling lens coupling a divergent light flux from the light source with a subsequent system;

a deflector having a deflecting surface arranged to deflect the light flux;

a first imaging system arranged between the coupling lens and the deflector and having a power in the sub-scanning direction so as to transform the light flux from the coupling lens into a substantially linear image in a vicinity of the deflecting surface of the deflector;

a second imaging system arranged to image the deflected light flux into an optical beam spot on the surface to be scanned; and an intercepting member arranged to intercept light which is emitted from a back of the semiconductor laser chip and dispersed in the case and passes through the opening in the case before reaching the surface to be scanned.

19. An image forming apparatus comprising:

a light source including a case and a semiconductor laser chip having a plurality of light emitting points, the case having an opening for allowing light generated by the semiconductor laser chip and emitted by the plurality of light emitting points to emerge therefrom as a light flux;

a deflector having a deflecting surface arranged to deflect the light flux; and at least one imaging system arranged to transform the deflected light flux from the deflector an optical beam spot on the surface to be scanned at an image writing area; wherein wherein a light emitted from a back of the semiconductor laser chip is dispersed in the case, and an emerging direction of the dispersed light is set such that the dispersed light passed though the opening reaches portions of the surface to be scanned other than the image writing area.

* * * * *

UNITED STATES PATENT AND TRADEMARK OFFICE
CERTIFICATE OF CORRECTION

PATENT NO.    : 6,381,057 B1
DATED         : April 30, 2002
INVENTOR(S)   : Itabashi, Akihisa It is certified that error appears in the above-identified patent and that said Letters Patent is hereby corrected as shown below:

<u>Title page, Item [54] and Column 1, line 1,</u>
The title of the invention should read -- MULTI-BEAM SCANNING APPARATUS PREVENTING GHOST LIGHT FROM REACHING SCANNING SURFACE --.

Signed and Sealed this

Tenth Day of September, 2002

*Attest:*

JAMES E. ROGAN
*Attesting Officer*            *Director of the United States Patent and Trademark Office*